(No Model.)
W. W. TUCKER.
GRINDING FIXTURE.
No. 482,212. Patented Sept. 6, 1892.
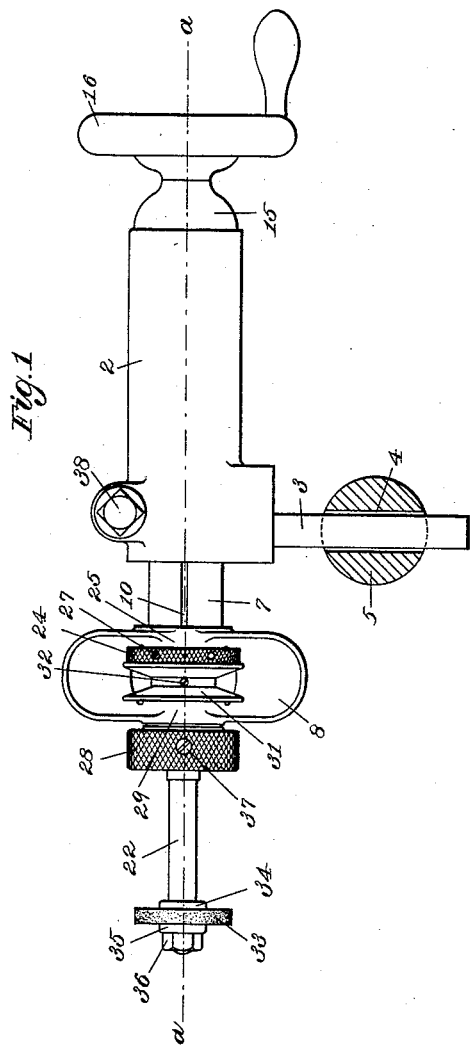
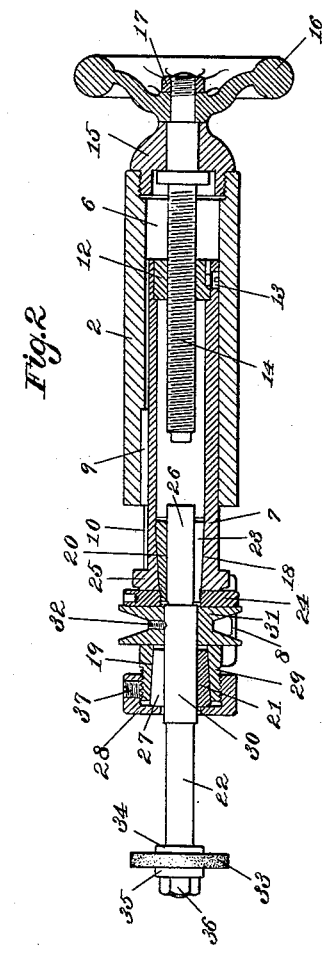
Witnesses:
Henry L. Reckard.
H. Mallner
Inventor:
W. W. Tucker,
By his Attorney,
F. H. Richards

UNITED STATES PATENT OFFICE.

WILLIAM W. TUCKER, OF HARTFORD, CONNECTICUT.

GRINDING-FIXTURE.

SPECIFICATION forming part of Letters Patent No. 482,212, dated September 6, 1892.

Application filed February 29, 1892. Serial No. 423,156. (No model.)

*To all whom it may concern:*

Be it known that I, WILLIAM W. TUCKER, a citizen of the United States, residing at Hartford, in the county of Hartford and State of Connecticut, have invented certain new and useful Improvements in Grinding-Fixtures, of which the following is a specification.

This invention relates to that class of grinding-fixtures adapted to be used in lathes for grinding internal cylindrical surfaces, the object being to furnish a fixture adapted by reason of its peculiar construction to be maintained in accurate adjustment for producing such precision work as dies and ring-gages.

In the drawings accompanying and forming a part of this specification, Figure 1 is a plan view of a grinding-fixture embodying my invention. Fig. 2 is a longitudinal vertical section of the same in line $a\,a$ of Fig. 1.

Similar characters designate like parts in both figures.

The slide-holder or body of the fixture is designated by 2 and has a shank 3, designed to be removably fixed in the usual mortise 4 of an ordinary tool-post, as indicated in section at 5, Fig. 1. Said body or slide-carrier 2 is bored at 6 longitudinally thereof to receive the sliding shank or stem 7 of the spindle-carrier 8, which supports the principal operative parts of the fixture. Said stem 7 is prevented from rotating in the bore 6 by means of a key or spline 9, fixed in the holder 2 and engaging a keyway or groove 10, formed in said stem. The stem 7 is hollow the entire length thereof, and has a nut 12 removably fixed in the inner end thereof by means of the pin or screw 13. Said nut 12 is threaded to mesh with the screw 14, which is journaled in a hub or nut 15, that is screwed into the right-hand end of the holder 2, which screw is operated by means of a hand-wheel 16, fixed thereto by means of the nut 17 in the usual manner. By means of this hand-wheel and screw the operator may advance or retract the spindle-carrier 8 and the operative parts carried thereby, as may be required. In the forward end of the stem 7 the bore thereof is tapered from the left hand outwardly toward the right hand, as indicated at 18, within the hub 25 of the part 8, to receive the correspondingly-tapered bushing or spindle-bearing 20, in which is carried one end of the spindle 22. The other journal of this spindle is carried in the bushing or bearing 21, which is similarly supported in the tapered bore (indicated at 19) of the forward hub 29 of the carrier 8. Said bushing is split at 27 on one side thereof and is adjusted longitudinally for the purpose of regulating its internal diameter by means of the adjusting-ring 28, which is screwed onto a thread formed in the projecting end of said hub and is usually held in place by means of a set-screw 37. The bushing 20 is split at 23 on one side thereof, and is threaded at its projecting left-hand end to mesh with the thread within the adjusting-nut 24, which bears against the end of the inner hub 25 of said carrier 8. By means of said nut 24 the bearing 20 may be drawn into the tapered bore 18, thereby springing said bushing more closely upon the journal 26 of the spindle 22, thus producing a very close fit of said spindle in its bearing. The bushing 21, as hereinbefore described, being similarly split at 27, is likewise adjusted to the journal 30 of said spindle by means of the nut 28.

A spindle-actuating pulley 31 is fixed to the spindle 22 between the hub 29 and the nut 24 by means of a set-screw 32 or some other wheel-fastening device. (Not shown.) Said pulley fits closely between the hub 29 of the spindle-carrier and the nut 24, thereby controlling the longitudinal position of the spindle in its bearings. The emery-wheel or other grinding-tool 33 is carried on the outer end of the spindle 22, being shown clamped between the flanges 34 and 35 by means of a nut 36 in the usual manner. The nut 24 may be provided with a set-screw 27, similar to the screw 37 in the ring 28, for preventing accidental displacement of said nut. The body or holder 2 of the fixture is preferably split on one side thereof for a portion of its length and provided with means, as the clamp-screw 38, for regulating the closeness of the stem 7 of the carrier within the bore 6 of said holder. The spindle 22 is in practice rotated at a high speed by means of a round belt (not shown) running in the V-groove of the pulley 31.

By means of the peculiar organization and construction of the parts herein shown and described the spindle may be kept in very accurate and close adjustment while maintaining its freedom of rotation, thus keeping the fixture continuously in that perfect condition necessary for performing with precision the specified class of work. Since the bearing 20 is closed up by drawing it outwardly, as described, and the nut 24 is always accessible, and since the adjustment of the bearing does not change the position of the nut the regulation of the spindle-journal 26 is readily effected while the fixture is set in use, the bearing being closed a little from time to time as the user proceeds with his work without disturbing the setting of the fixture or the precise working position of the grinding-wheel. These are advantages which will be readily understood and appreciated by those mechanics who are engaged on precision work of the kinds mentioned.

Having thus described my invention, I claim—

1. In a fixture of the class specified, the combination, with a holder and with a carrier, substantially as described, having a tubular stem fitted to slide in the holder, the bore of said stem at the forward end thereof being tapered substantially as described, of the spindle, the adjustable outer bearing for the spindle, the adjustable inner bearing 20, fitting in the tapered portion of said bore, and means, substantially as described, for adjusting said bearing 20 within the tubular stem, substantially as set forth.

2. In a fixture of the class specified, the combination, with the holder and with the sliding spindle-carrier having the hollow stem 7 fitted to slide in the holder, of the spindle, the conical bearing 20, having its larger end within the bore of the stem, the nut 24, engaging the smaller end of said bearing for adjusting the same, the removable carrier-actuating nut 12, and a screw engaging the nut 12 for sliding the spindle-carrier, whereby the carrier may be actuated and on removal of the nut 12 the bearing 20 may be removed through the tubular stem of said carrier, substantially as described.

3. In a fixture of the class specified, the combination, with the carrier 8, having the hubs 29 and 25, and the tubular stem 7, fitted to receive a tapered bearing, of the bearings 21 and 20, fitting within said hubs, respectively, the spindle supported in said bearings, the driving-wheel fixed on the spindle, the nut 24 for adjusting the bearing 20, the ring 28 for adjusting the bearing 21, and means for supporting and actuating the carrier, substantially as shown and described.

WILLIAM W. TUCKER.

Witnesses:
FRANCIS H. RICHARDS,
HENRY L. RECKARD.